(12) United States Patent
Dalea et al.

(10) Patent No.: US 12,448,094 B2
(45) Date of Patent: Oct. 21, 2025

(54) INTERNAL FLUID RESERVOIR FOR GYROSCOPIC BOAT STABILIZER

(71) Applicant: WaveTamer LLC, Greenville, NC (US)

(72) Inventors: Cristian Virgil Dalea, Canton, MI (US); Matthew James Van Benschoten, Wolverine Lake, MI (US); James Paul Bowser, Plymouth, MI (US)

(73) Assignee: WAVETAMER LLC, Greenville, NC (US)

( * ) Notice: Subject to any disclaimer, the term of this patent is extended or adjusted under 35 U.S.C. 154(b) by 444 days.

(21) Appl. No.: 18/141,175

(22) Filed: Apr. 28, 2023

(65) Prior Publication Data

US 2023/0356816 A1 Nov. 9, 2023

Related U.S. Application Data

(60) Provisional application No. 63/337,942, filed on May 3, 2022.

(51) Int. Cl.
*B63B 39/04* (2006.01)
(52) U.S. Cl.
CPC ................... *B63B 39/04* (2013.01)
(58) Field of Classification Search
CPC .......... B63B 39/04; B63J 3/04; F16C 37/007; F16C 35/073; F16C 35/077; G01C 19/20
USPC .................................................. 114/121, 122
See application file for complete search history.

(56) References Cited

U.S. PATENT DOCUMENTS

| | | | |
|---|---|---|---|
| 8,117,930 | B2 | 2/2012 | Adams et al. |
| 11,427,289 | B2 * | 8/2022 | Smith ................. F16F 15/3156 |
| 2011/0209568 | A1 | 9/2011 | Anderson |
| 2017/0009845 | A1 | 1/2017 | Arseneaux et al. |
| 2018/0269743 | A1 | 9/2018 | Buttner et al. |
| 2019/0367137 | A1 | 12/2019 | Smith et al. |
| 2020/0317308 | A1 | 10/2020 | Peterson |

FOREIGN PATENT DOCUMENTS

| | | |
|---|---|---|
| CN | 104578595 A | 4/2015 |
| CN | 207064483 U | 3/2018 |
| CN | 110131319 A | 8/2019 |
| EP | 3339804 A1 | 6/2018 |
| WO | 2019232371 A1 | 12/2019 |

\* cited by examiner

*Primary Examiner* — Daniel V Venne
(74) *Attorney, Agent, or Firm* — COATS & BENNETT, PLLC (57) ABSTRACT

A gyroscopic roll stabilizer for a boat includes a cavity for liquid heat transfer medium that helps transfer heat from a flywheel shaft to a heat transfer shaft assembly that extends into the cavity. The cavity includes a first portion that overlaps the heat transfer shaft assembly and a reservoir portion that does not, with the second portion acting as a reservoir for the liquid heat transfer medium. The wall of the cavity is shaped such that the first portion is wider than the second portion. When the flywheel is rotating five thousand rpm or more, liquid heat transfer medium in the reservoir is displaced upward into the first portion, and a gas pocket that is present in the first portion when the flywheel is not rotating is displaced into the reservoir, thereby providing better heat transfer when the flywheel is spinning rapidly. Related methods are also disclosed.

20 Claims, 7 Drawing Sheets

INTERNAL FLUID RESERVOIR FOR GYROSCOPIC BOAT STABILIZER

This application claims the benefit of U.S. Provisional Application No. 63/337,942, filed 3 May 2022, the disclosure of which is incorporated herein by reference in its entirety.

TECHNICAL FIELD

The present disclosure relates generally to boat roll stabilizers for reducing the rolling motion of a boat and, more particularly, to controlled moment gyroscopes for reducing the roll of a boat based on the gyroscopic effect.

BACKGROUND

The sideways rolling motion of a boat can create safety problems for passengers and crew on boats, as well as cause discomfort to passengers not accustomed to the rolling motion of the boat. A number of technologies currently exist to reduce the sideways rolling motion of a boat. One technology currently in use is gyroscopic boat stabilization for roll suppression, which is based on the gyroscopic effect. A control moment gyroscope (CMG) is mounted in the boat and generates a torque that can be used to counteract the rolling motion of the boat. The CMG includes a flywheel that spins at a high speed. A controller senses the attitude of the boat and uses the energy stored in the flywheel to "correct" the attitude of the boat by applying a torque to the hull counteracting the rolling motion of the boat.

Although CMGs are gaining in popularity, particularly for smaller fishing boats and yachts, such devices are somewhat complicated. For example, CMGs that utilize some forms of bearing cooling for the bearings supporting the flywheel may have a fluid heat transfer medium disposed in or around one or both end portions of the flywheel shaft, such as in cavities formed in the end portions of the flywheel shaft. However, properly distributing this fluid heat transfer medium in the corresponding cavity during operation may sometimes be problematic, particularly due to the high rotational speed of the flywheel in operation and/or thermal expansion/contraction of the fluid heat transfer medium.

Thus, there is a need for approaches to configuring control moment gyroscopes to encourage proper distribution of fluid heat transfer medium during operation.

SUMMARY

The present disclosure relates to a gyroscopic roll stabilizer for a boat that includes a cavity for liquid heat transfer medium that helps transfer heat from a flywheel shaft to a heat transfer shaft assembly that extends into the cavity. The cavity includes a first portion that overlaps the heat transfer shaft assembly and a second portion that does not. The second portion of the cavity acts as a reservoir for the liquid heat transfer medium. The wall of the cavity is shaped differently in the first portion than in the second portion, such that the first portion is wider. When the flywheel is rotating at five thousand rpm or more, liquid heat transfer medium in the reservoir is displaced upward into the first portion (by centrifugal force), and a gas pocket that is present in the first portion when the flywheel is not rotating is displaced partially or fully into the reservoir. This displacement of the gas pocket allows for more optimal filling of the gap space between the heat transfer shaft assembly and the cavity wall by the liquid heat transfer medium when spinning rapidly, thereby providing better heat transfer when the flywheel is spinning rapidly. Related methods are also disclosed.

In one aspect, the present disclosure is directed to a gyroscopic roll stabilizer for a boat. In some aspects, the gyroscopic roll stabilizer includes an enclosure, a flywheel assembly, a motor, a first heat transfer shaft assembly, and liquid heat transfer medium. The enclosure is mounted to a gimbal for rotation about a gimbal axis and configured to maintain a below-ambient pressure. The flywheel assembly includes a flywheel and flywheel shaft. The flywheel shaft has a first end and an opposite second end. The flywheel assembly is rotatably mounted inside the enclosure for rotation about a flywheel axis. The flywheel shaft has a first open-ended cavity formed in the first end and facing away from the second end. The motor is operative to rotate the flywheel assembly. The first heat transfer shaft assembly is rotationally fixed relative to the flywheel axis and extends from the enclosure into the first cavity. A first seal mounted so as to contact both the first heat transfer shaft assembly and the flywheel shaft. A first interior wall of the flywheel shaft outwardly bounds the first cavity and faces toward the flywheel axis, with the first interior wall radially spaced from the first heat transfer shaft assembly by a first gap space. The first cavity has a first portion disposed about the first heat transfer shaft assembly, and a second portion disposed farther from the first seal than a tip of the first heat transfer shaft assembly. The second portion forms a reservoir. The first interior wall is spaced farther from the flywheel axis in the first portion than in the second portion. The liquid heat transfer medium is disposed in the first cavity and trapped in the flywheel shaft by the first seal. The gyroscopic roll stabilizer is configured such that: 1) when the gyroscopic roll stabilizer is in a first mode where the flywheel assembly is not rotating, the liquid heat transfer medium fills the reservoir and partially fills the gap space of the first portion by first amount so that a gas pocket exists in the gap space between the first seal and the liquid heat transfer medium; and 2) when the gyroscopic roll stabilizer is in a second mode where the flywheel assembly is rotating at least five thousand rpm, the liquid heat transfer medium partially fills the reservoir and at least partially fills the gap space of the first portion by second amount, the second amount more than the first amount, and the gas pocket is at least partly disposed in the second portion of the first cavity.

In another aspect, the disclosure is directed to a method of operating a gyroscopic roll stabilizer for a boat. The method includes changing the gyroscopic roll stabilizer from a stopped mode to a running mode. The gyroscopic roll stabilizer includes an enclosure, a flywheel assembly, a first heat transfer shaft assembly, and liquid heat transfer medium. The enclosure is mounted to a gimbal for rotation about a gimbal axis and configured to maintain a below-ambient pressure. The flywheel assembly includes a flywheel and flywheel shaft. The flywheel shaft has a first end and an opposite second end. The flywheel assembly is rotatably mounted inside the enclosure for rotation about a flywheel axis. The flywheel shaft has a first open-ended cavity formed in the first end and facing away from the second end. The first heat transfer shaft assembly is rotationally fixed relative to the flywheel axis and extending from the enclosure into the first cavity. A first seal mounted so as to contact both the first heat transfer shaft assembly and the flywheel shaft. A first interior wall of the flywheel shaft laterally outwardly bounds the first cavity and faces toward the flywheel axis, with the first interior wall laterally radially spaced from the first heat transfer shaft assembly by a first gap space. The first cavity has a first portion disposed about the first heat transfer shaft assembly, and a second portion disposed farther from the first seal than a tip of the first heat transfer shaft assembly. The second portion forms a reservoir. The first interior wall is spaced farther from the flywheel axis in the first portion than in the second portion. The liquid heat transfer medium is disposed in the first cavity and trapped in the flywheel shaft by the first seal. In the stopped mode, the flywheel assembly is not rotating, and the liquid heat transfer medium fills the reservoir and partially fills the gap space of the first portion by first amount so that a gas pocket exists in the gap space between the first seal and the liquid heat transfer medium. In the running mode, the flywheel assembly is rotating at least five thousand rpm, and the liquid heat transfer medium partially fills the reservoir and at least partially fills the gap space of the first portion by second amount, the second amount more than the first amount, and the gas pocket is at least partly disposed in the second portion of the first cavity. The changing of modes includes moving at least some liquid heat transfer medium from the second portion to the first portion of the first cavity without changing a mass of the liquid heat transfer medium in the flywheel shaft. No liquid heat transfer medium is added or subtracted from the flywheel shaft during the changing of modes.

The features, functions and advantages that have been discussed above, and/or are discussed below, can be achieved independently in various aspects or may be combined in yet other aspects, further details of which can be seen with reference to the following description and the drawings.

DETAILED DESCRIPTION

Figure 1A:
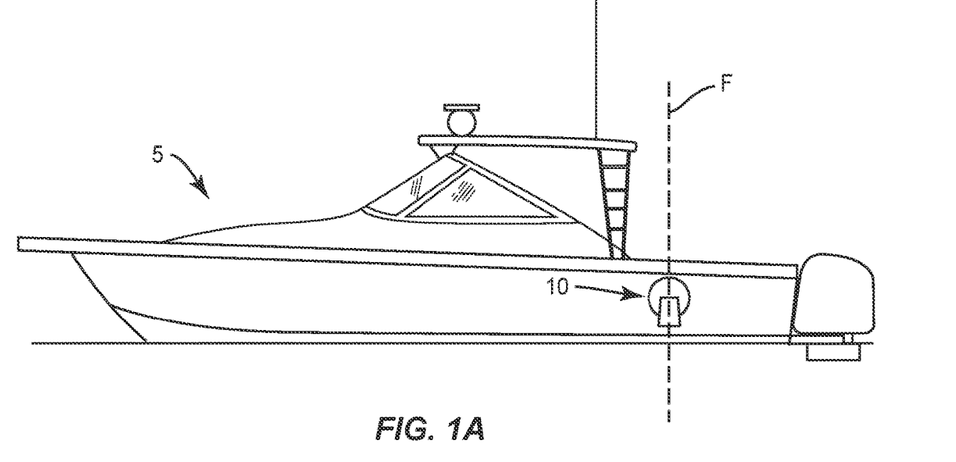
FIGS. 1A and 1B illustrate a boat equipped with a CMG as herein described.
Figure 1B:
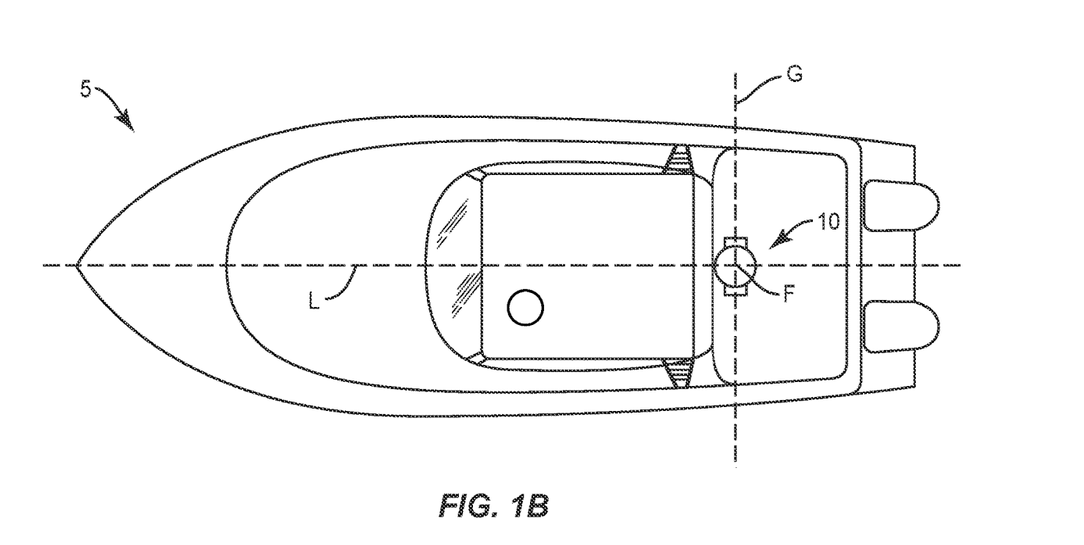

Referring now to the drawings, FIGS. 1A and 1B illustrate a control moment gyroscope (CMG) 10 mounted in a boat 5 for roll stabilization. Multiple embodiments of the CMG 10 are described. For convenience, similar reference numbers are used in the following description of the embodiments to indicate similar elements in each of the embodiments.

Figure 2:
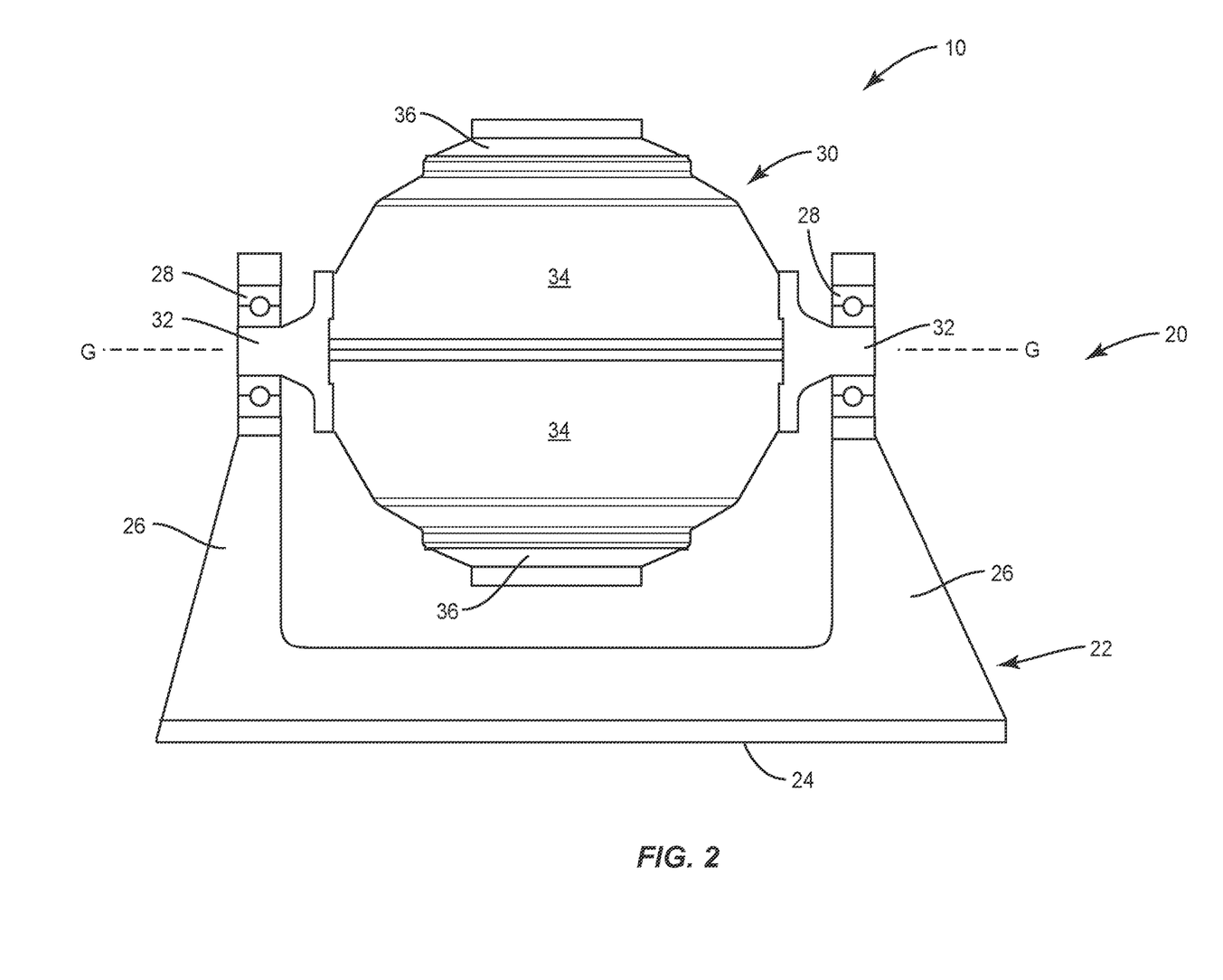
FIG. 2 show an elevation view of a CMG configured as a boat roll stabilizer according to an embodiment.
Figure 3:
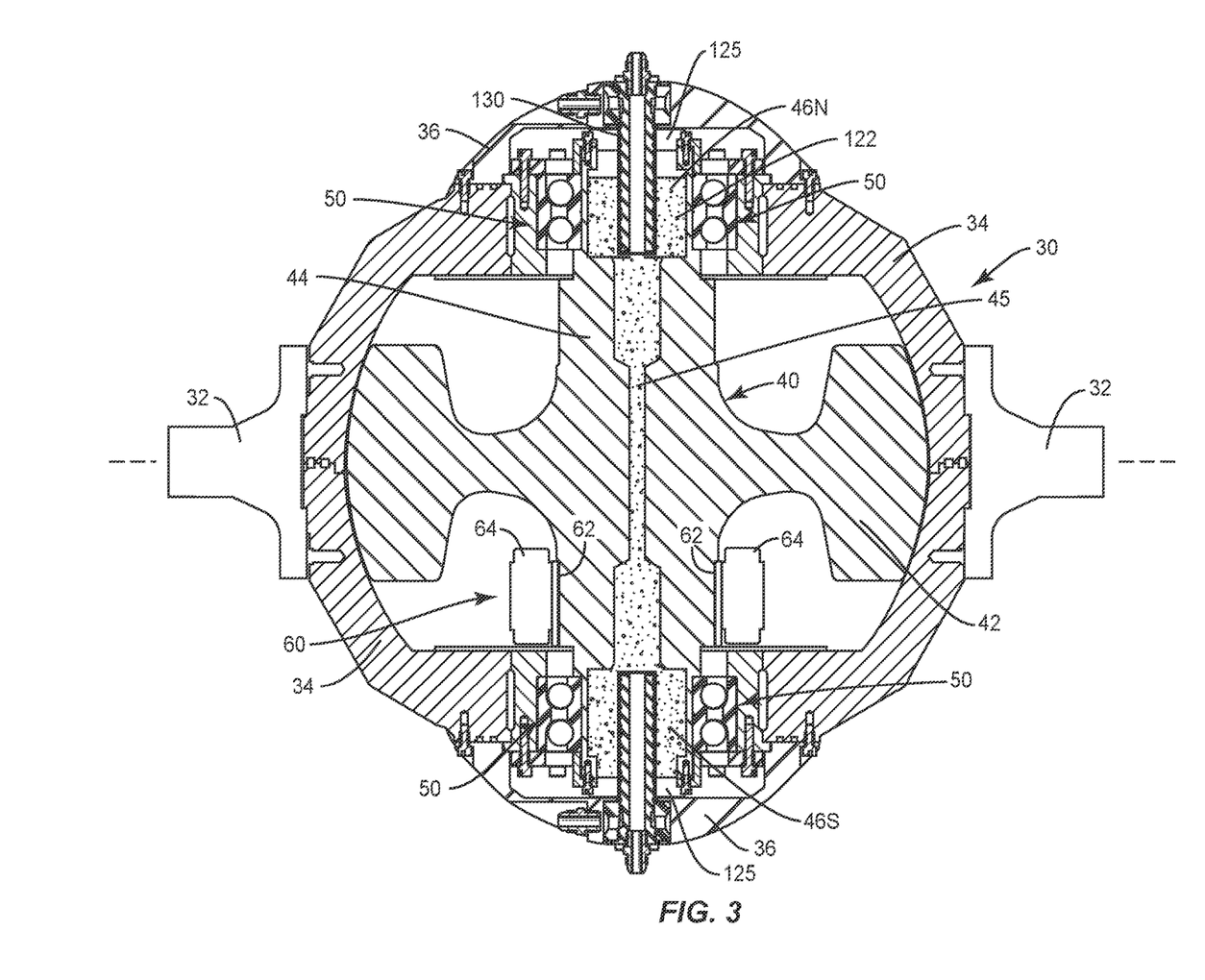
FIG. 3 shows a section view through the enclosure of a CMG according to an embodiment.

Referring now to FIGS. 2 and 3, the main functional elements of the CMG 10 comprise a single-axis gimbal 20, an enclosure 30 mounted to the gimbal 20 for rotation about a gimbal axis G, a flywheel assembly 40 mounted by bearings 50 inside the enclosure, a motor 60 to rotate the flywheel assembly 40, and a torque control system 70 (FIG. 4) to control precession of the flywheel assembly 40 so that the energy of the flywheel assembly 40 is transferred to the hull of the boat 5 to counteract rolling motions. Each of the embodiments further comprises a bearing cooling system 100 to cool the flywheel bearings 50. Various designs of the bearing cooling system 100 are shown in the figures.

The gimbal 20 comprises a support frame 22 that is configured to be securely mounted in the boat 5. Preferably, the gimbal 20 is mounted along a longitudinal axis L of the boat 5 with the gimbal axis G extending transverse to the longitudinal axis L. Conventionally, the gimbal 20 is mounted in the hull of the boat 5, but could be mounted at any location. The support frame 22 of the gimbal 20 comprises a base 24 and two spaced apart supports 26. A bearing 28 is mounted on each support 26 for rotatably mounting the enclosure 30 to the supports 26. For this purpose, the enclosure 30 includes two gimbal shafts 32 projecting from diametrically opposed sides of the enclosure 30. The gimbal shafts 32 are rotatably journaled in the gimbal bearings 28 to allow the enclosure 30 and flywheel assembly 40 to rotate or precess about the gimbal axis G in the fore and aft directions.

The enclosure 30 is generally spherical in form and comprises two main housing sections 34 and two cover plates 36. The two main housing sections 34 join along a plane that typically bisects the spherical enclosure 30. The cover plates 36 mount to the main housing sections 34, typically along respective planes, closer to the "poles" of the spherical enclosure 30. All joints in the enclosure 30 are sealed to maintain a below-ambient pressure within the enclosure 30 to reduce aerodynamic drag on the flywheel assembly 40. Typical below-ambient pressures should be in the range of 1-40 torr (133-5333 Pa, 0.02-0.77 psi).

Referring to FIG. 3, the flywheel assembly 40 comprises a flywheel 42 and flywheel shaft 44 that is mounted for rotation inside the enclosure 30, typically such that the axis of rotation F of the flywheel assembly 40 is perpendicular to the gimbal axis G. Thus, when the boat 5 is level such that gimbal axis G is horizontal, the axis of rotation F of the flywheel shaft 44 will be in the vertical direction, typically perpendicular to the deck of the boat. The flywheel 42 and flywheel shaft 44 may be formed as a unitary piece, or may comprise two separate components rotationally fixed to one another. In one exemplary embodiment, the diameter and the flywheel 42 is approximately 20.5 inches and the flywheel assembly 40 has a total weight of about 614 lbs. The flywheel assembly 40 in this example has a moment of inertia of about 32,273 Ibm in$^2$; and, when rotated at a rate of 9000 rpm, the angular momentum of the flywheel assembly 40 is about 211,225 Ibm ft$^2$/s.

The flywheel assembly 40 is supported by upper and lower bearing assemblies inside the enclosure 30. Each bearing assembly typically comprises a bearing 50 mounted within a bearing block 58. Each bearing 50 comprises an inner race 52 that is affixed to and rotates with the flywheel shaft 44, an outer race 54 that is mounted inside the bearing block 58, and one or more ball bearings 56 disposed between the inner and outer races 52, 54. The bearing blocks 58 are secured to the interior of the enclosure 30. The outer race 54 is mounted to bearing block 58, and bearing block 58 is mounted to the enclosure 30, so that the outer race 54 is rotationally fixed relative to the enclosure 30. The mounting of the bearing block 58 to the enclosure 30 may be via any suitable means, such as by suitable lip(s) in the bearing block 58 and one or more bearing cap plates 59a held by screws. Likewise, the affixing of the inner race 52 to the flywheel shaft 44 may be by any suitable means, such as press fitting, and/or suitable lip(s) in the flywheel shaft 44 and one or more bearing cap plates 59b held by screws. The bearing block 58 may be generally round in cross-section (perpendicular to flywheel axis F), but this is not required and any suitable shape may be employed, including faceted shapes. Suitable seals (not shown) are optionally disposed on the top and bottom of the bearings 50 to contain lubricant in the bearings 50.

The motor 60 rotates the flywheel assembly 40 at a high rate of speed (e.g., 9000 rpm). The motor 60 typically includes a rotor 62 that is mounted to the flywheel shaft 44 and a stator 64 that this secured to the enclosure 30 by any suitable mounting system. Although the motor 60 is advantageously mounted inside the enclosure 30, it is also possible to mount the motor 60 on the exterior of the enclosure 30. In one embodiment, the motor 60 operates on 230 volt single phase AC power (or alternatively three-phase AC power, or AC or DC battery power, such as from a lithium ion battery pack).

Figure 4:
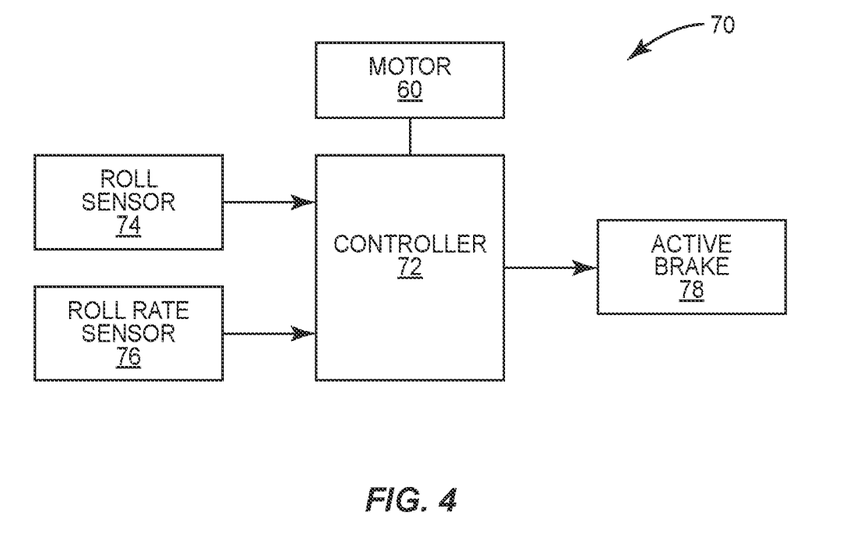
FIG. 4 shows a torque control system for the CMG.

The torque control system 70, shown in FIG. 4, controls the rate of precession of the flywheel assembly 40 about the gimbal axis G. The rolling motion of a boat 5 caused by wave action can be characterized by a roll angle and roll rate. The rolling motion causes the flywheel assembly 40 to precess about the gimbal axis G. Sensors 74, 76 measure the roll angle and roll rate respectively, which are fed to a controller 72. The controller 72 generates control signals to control an active braking system or other torque applying device 78 that controls the rate of precession of the flywheel assembly 40. By controlling the rate of precession, the flywheel assembly 40 generates a torque in opposition to the rolling motion. This torque is transferred through the gimbal 20 to the boat 5 to dampen the roll of the boat 5. An example of the active braking system 78 is described in U.S. patent Ser. No. 11/440,629, entitled "Braking System For Gyroscopic Boat Roll Stabilizer."

When the flywheel assembly 40 rotates at high speed, the bearings 50 and motor 60 may generate a substantial amount of heat, particularly when the flywheel assembly 40 is precessing, which could lead to bearing and/or motor failure. Cooling the bearings is challenging, particularly when the interior of the enclosure 30 is a significantly below ambient pressure environment. Bearing cooling system 100 allows cooling of bearings 50, and other heat generating components contained within the enclosure 30. In some exemplary embodiments, the bearing cooling system 100 transfers heat to a heat sink that is in turn cooled by coolant flowing along a cooling circuit 100 that enters and exits the enclosure 30. The heat removal is achieved without direct contact of the recirculated oil or other liquid coolant with the bearings 50, which may otherwise result in high frictional losses.

Figure 5:
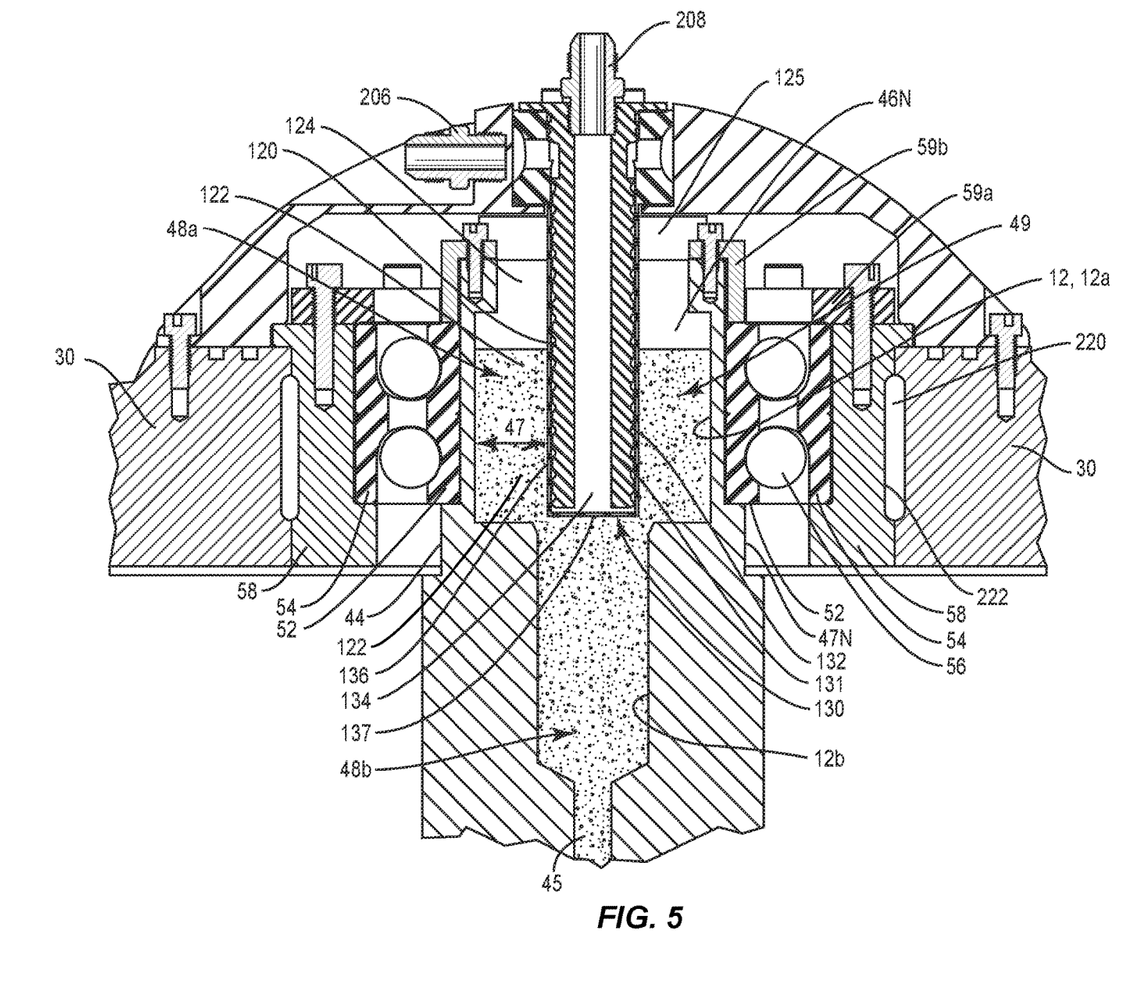
FIG. 5 shows a partial section view illustrating portions of the embodiment of FIG. 3, with the CMG in the first mode.

Note that the flywheel shaft 44 has a first end and an opposite second end. For ease of reference, these may be referred to as the north end 47N and the south end 47S, it being understood that such labels are merely for convenience, and the orientations may be reversed as desired. The north end 47N of the flywheel shaft 44 includes an open-ended cavity 46N, which faces away from the flywheel 42. Optionally, the south end 47S of the flywheel shaft 44 includes an open-ended cavity 46S, which faces away from the flywheel 42. These cavities 46N, 46S are involved with cooling the bearings 50, and may generically be referred to as cavity 46. Note that the cavities 46 are open-end in that they are open-ended with respect to the rest of the flywheel shaft 44, even if the cavities 46 are closed off by other components, such as seal 125 and/or cover plates 36. Note that inner race 52 of bearing 50 is affixed to the flywheel shaft 44 proximate cavity 46. In the discussion below, cooling of bearings 50 associated with the north end 47N will be discussed; it being understood that cooling of bearings 50 associated with the south end 47S is advantageously performed similarly, and discussion of the cooling of the bearings 50 associated with the south end 47S is generally omitted for clarity. However, it should be noted that the cooling of the south end 47S, in some embodiments, may be accomplished by other bearing cooling approaches known in the art.

Figure 7:
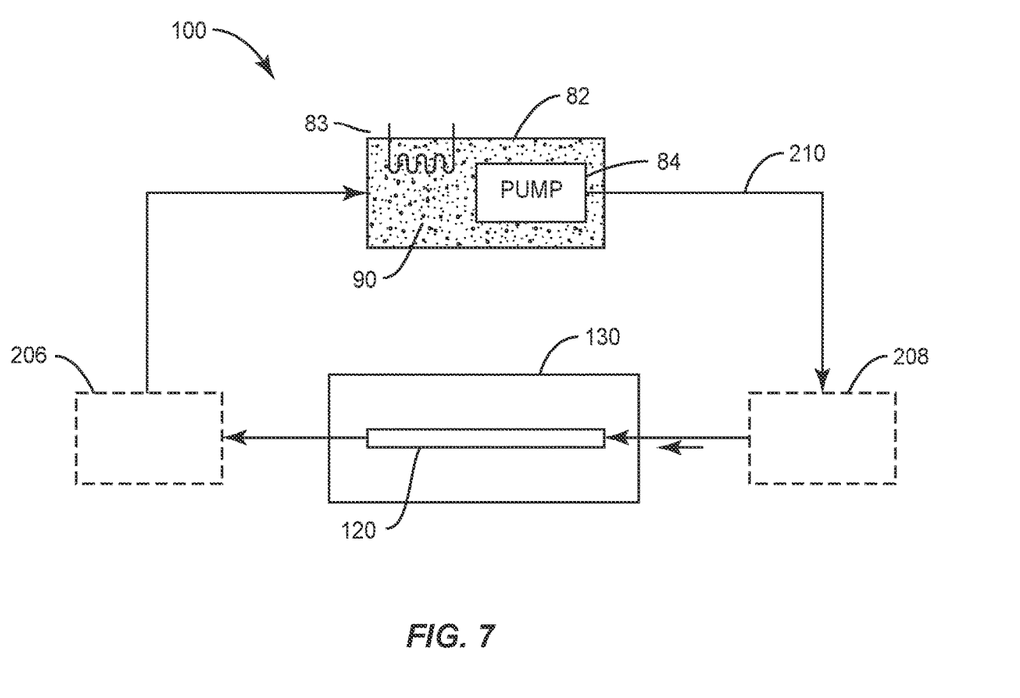
FIG. 7 shows a simplified schematic of a bearing cooling circuit.

Bearing cooling circuit 100 is configured to transfer heat away from the inner race 52 of the bearing 50 by recirculating cooling fluid 90. See FIG. 7. The cooling fluid 90 in bearing cooling circuit 100 may be any suitable fluid, with a liquid such as glycol and/or glycol mixtures being particular examples. The cooling fluid 90 is routed from external to the enclosure 30, into the enclosure 30, through the fluid channel 120 (which is inside the enclosure 30), where the cooling fluid 90 collects heat generated by (at least) bearing 50, and back out external of the enclosure 30 for removal of heat, then recirculated for additional heat collection and removal. FIG. 7 shows a schematic view of bearing cooling circuit 100. In FIG. 7, bearing cooling circuit 100 includes a reservoir 82 for the cooling fluid 90 flowing through the closed circuit of cooling circuit 100, and a fluid pump 84 operative to recirculate the cooling fluid 90 through bearing cooling circuit 100, and a heat exchanger 83. The pump 84 is operatively connected to the fluid channel 120 and configured to recirculate the cooling fluid 90 through the fluid channel 120 to remove heat from the inner race 52 via the flywheel shaft 44, liquid heat transfer medium 122, and heat transfer shaft assembly 130 (discussed further below). The heat exchanger 83 is operatively connected to the closed fluid pathway 210 and configured to remove heat from the cooling fluid 90 to ambient after the cooling fluid 90 has passed through fluid channel 120. In some aspects, the fluid pathway 210 also includes an inlet port 206 and an outlet port 208 (see FIG. 5). The inlet port 206 is operatively disposed between the pump 84 and the fluid channel 120, and operative to allow passage of the cooling fluid 90 into the enclosure 30 toward the fluid channel 120. The outlet port 208 is operatively disposed between the fluid channel 120 and the heat exchanger 83, and operative to allow passage of the cooling fluid 90 out of the enclosure 30 toward the heat exchanger 83.

As discussed above, the cooling fluid 90 is routed through fluid channel 120 for heat collection. Fluid channel 120 is disposed in heat transfer shaft assembly 130, see FIG. 5. As mentioned above, the flywheel shaft 44 includes open-ended cavity 46 formed in the end of flywheel shaft 44. A liquid heat transfer medium 122 is disposed in cavity 46. The liquid heat transfer medium 122 may be any suitable material for operating in the low-pressure environment of the enclosure 30. For example, the liquid heat transfer medium 122 may be hydrocarbon oils (alkylated aromatics as well as alkanes, paraffinic mineral oils, and other synthetic hydrocarbons), fluorocarbon oils (such as PFPE), silicone fluids of various chain lengths (e.g., polydimethylsiloxane (PDMS)), glycol mixtures, and combinations thereof. The liquid heat transfer medium 122 is held in cavity 46 by one or more suitable seals 125. As can be appreciated, the liquid heat transfer medium 122 is kept isolated from the cooling fluid 90, and the two do not intermix as part of the cooling process. Instead, the liquid heat transfer medium 122 is and remains trapped in the flywheel shaft 44, and kept exterior to the heat transfer shaft assembly 130, while the cooling fluid 90 is segregated from the cavity 46 and internally cools the heat transfer shaft assembly 130 that is present in the cavity 46. In addition, the cooling fluid 90 flows outside of the enclosure 30 during its recirculation, while the liquid heat transfer medium 122 is intended to remain in the flywheel shaft 44, during the bearing cooling process.

As shown in FIG. 5, bearing cooling circuit 100 includes a heat transfer shaft assembly 130 rotationally fixed relative to the flywheel axis F and extending from the enclosure 30 into cavity 46 so as to contact liquid heat transfer medium 122. The bearing cooling circuit 100 also includes a closed fluid pathway 210 for the cooling fluid 90 that extends through the heat transfer shaft assembly 130 to internally cool the heat transfer shaft assembly 130. The CMG 10 is configured to transfer heat away from the inner race 52 to the flywheel shaft 44, and from the flywheel shaft 44 to the liquid heat transfer medium 122, and from the liquid heat transfer medium 122 to the heat transfer shaft assembly 130, and from the heat transfer shaft assembly 130 to the cooling fluid 90. Note that the cavity 46 is wider (in the horizontal direction of FIG. 5) than the corresponding section of the heat transfer shaft assembly 130. Thus, the heat transfer shaft assembly 130 and the interior wall 12 of the cavity 46 are radially (laterally in FIG. 5) spaced from one another by a gap, and the liquid heat transfer medium 122 is disposed in this gap. This gap is a "radial" gap, it being understood that "radial" in this sense means in the direction perpendicular to the flywheel rotational axis F, and not necessarily associated with a perfect geometric circle or sphere. Thus, if either or both of the heat transfer assembly 130 and the inner wall of the cavity 46 are not round in cross-section, the radial gap may not be constant around the axis F, but still exists. This gap between the heat transfer shaft assembly and the interior wall 12 forms a gap space 49 where the interior wall 12 overlaps the heat transfer shaft assembly 130. The liquid heat transfer medium 122 is disposed in this gap. Optimal sizing of this gap may depend on the viscosity, heat transfer, and other characteristics of the liquid heat transfer medium 122, which impact the viscous drag and/or corresponding heat generation of the liquid heat transfer medium 122. In some aspects, this gap is advantageously in the range of about one half to one and a half inches.

In some aspects, the heat transfer shaft assembly 130 is a simple unified shaft that includes an internal chamber for the cooling fluid to be circulated through. In other aspects, the heat transfer shaft assembly 130 includes a shaft 131, a sleeve 136, and fluid channel 120. The shaft 131 extends from the enclosure 30 and into cavity 46. The shaft 131 advantageously has outer groove(s) 132 and an inner passage 134. Groove(s) 132 may be oriented perpendicular to the flywheel axis F, or may advantageously spiral around the flywheel axis F, such as by being helical or other spiral shape. Alternatively, groove(s) 132 may wind around the shaft 131 in any suitable fashion, such as in a sinusoidal shape, or a zig-zag shape, whether regular or irregular. Advantageously, the fluid pathway 210 peripherally surrounds the flywheel axis F, such as by circumnavigating the shaft 131. The sleeve 136 is disposed about the shaft 131 in spaced relation to the "floor" of the groove(s) 132 and in spaced relation to an inner wall on flywheel shaft 44 defining the cavity 46. A fluid channel 120 is jointly defined by the sleeve 136 and the groove(s) 132, with the fluid channel 120 having the cooling fluid therein. A closed fluid pathway 210 for recirculating cooling fluid 90 extends through fluid channel 120. Note that in alternative embodiments, the groove(s) 132 are alternatively and/or additionally formed on the sleeve 136. Thus, it should be considered that the fluid channel 120 is jointly formed by the shaft 131 and sleeve 136, regardless of whether the groove(s) 132 are in the shaft 131, or the sleeve 136, or both.

Cooling fluid 90 flows through the bearing cooling circuit 100, including the fluid channel 120. When shaft 131 with inner passage 134 is present, the inner passage 134 may be downstream relative to the fluid channel 120 along the fluid pathway 210, so that cooling fluid 90 flows through the fluid channel 120, and then out of the heat transfer shaft assembly 130 via the inner passage 134. In other aspects, the flow is reversed so that cooling fluid 90 flows through the inner passage 134, and then out of the heat transfer shaft assembly 130 via the fluid channel 120.

For the FIG. 5 arrangement, the heat flow for dissipating heat from the inner race 52 is from the inner race 52, to the flywheel shaft 44, then to the liquid heat transfer medium 122 to get across gap, then to the heat transfer shaft assembly 130, then to the cooling fluid 90, typically then to external to the CMG 10 via the heat exchanger 83.

As can be appreciated, keeping liquid heat transfer medium 122 in cavity 46 allows proper cooling of bearing 50. As such, seals, such as seal 125 in FIG. 5, are disposed to keep the liquid heat transfer medium 122 in cavity 46. In addition, the configuration of the cavity 46 helps encourage optimum performance. The cavity 46 has an interior wall 12 that laterally outwardly bounds the cavity 46 and faces the flywheel rotational axis F. The interior wall 12 is disposed about the heat transfer shaft assembly 130, but also extends down toward the opposing end portion of the flywheel shaft 44. Thus, the interior wall 12 has a first section 12a that is at least partially overlaps the heat transfer shaft assembly 130, and a second section 12b that is disposed farther from seal 125 than the tip 137 of the heat transfer shaft assembly 130. The first section 12a of the interior wall 12 is spaced farther from the flywheel rotational axis F than the second section 12b. Thus, the cavity 46 is "wider" within the cavity first portion 48a than in the cavity second portion 48b. Optionally, the second section 12b of interior wall 12 is disposed farther from the flywheel axis F than the outer surface of the heat transfer shaft 131. Further, a majority of the first interior wall 12, in the second portion 48b of the cavity 46, is optionally straight and parallel to the flywheel axis, or may advantageously outwardly taper upward toward the tip 137 of the heat transfer shaft assembly 130. The cavity first portion 48a and the cavity second portion 48b are advantageously centered on the flywheel rotational axis F.

Note that the first section 12a of the interior wall 12 is radially (laterally in FIGS. 3, 5-6) spaced from the heat transfer shaft assembly 130, with a gap space 49 formed therebetween. Thus, the cavity 46 has a wider first portion 48a proximate the heat transfer shaft assembly 130 and outwardly bounded by the first section 12a of the interior wall 12, and a narrower second portion 48b closer to the center of the CMG 10 and outwardly bounded by the second section 12b of the interior wall 12. As discussed further below, the second portion 48b functions as a reservoir, and may be referred to as a reservoir portion 48b.

Figure 6:
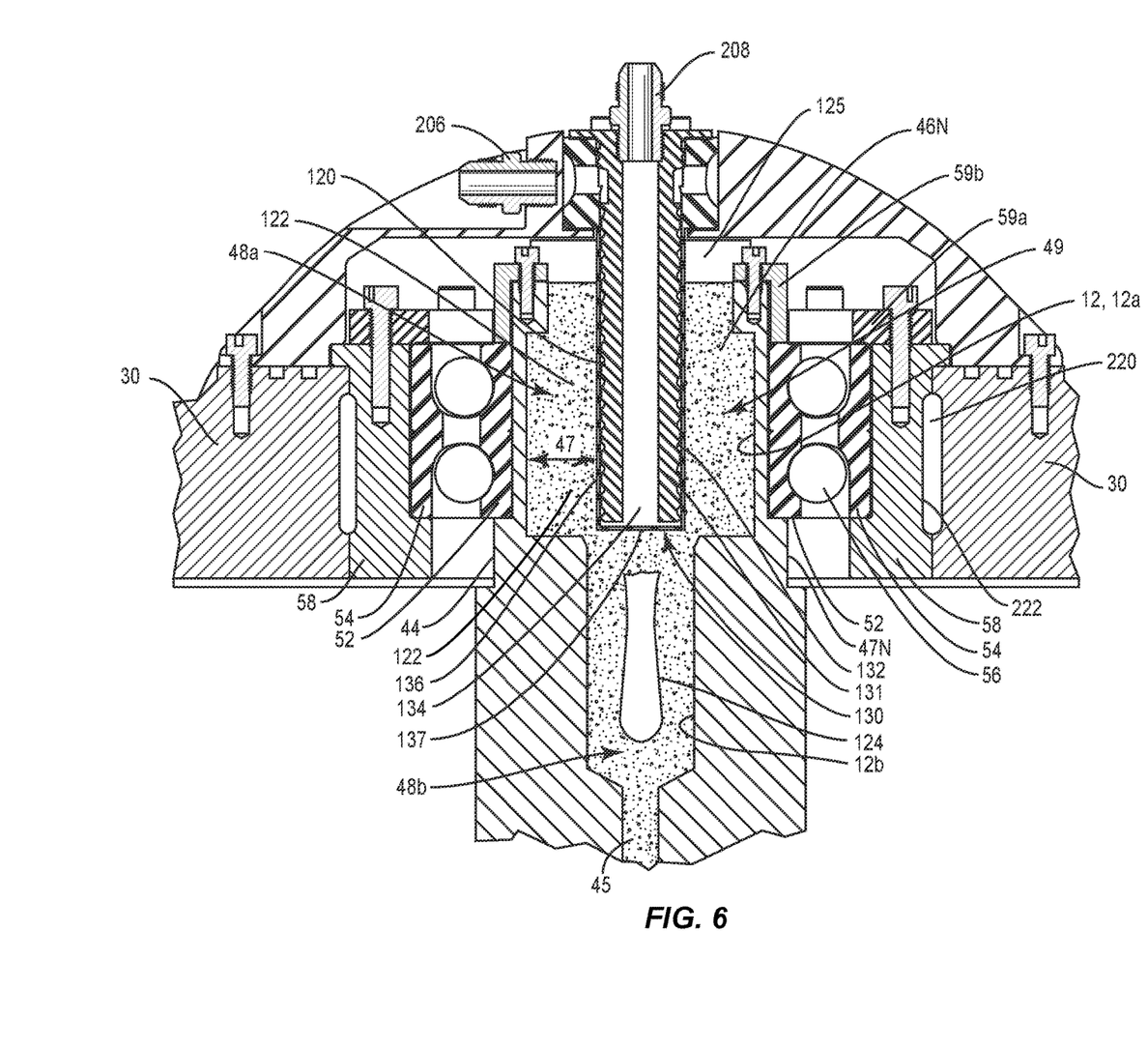
FIG. 6 shows the partial section view of FIG. 5, with the CMG in the second mode.

The liquid heat transfer medium 122 is disposed in the first cavity 46 and trapped in the flywheel shaft 44 by seal 125 which is mounted so as to contact both the first heat transfer shaft assembly 130 and the flywheel shaft 44. However, depending on the situation, the liquid heat transfer medium 122 may fill varying amounts of the gap space 49. When the CGM 10 is in a first (or stopped) mode where the flywheel assembly 40 is not rotating, the liquid heat transfer medium 122 fills the reservoir portion 48b of cavity 46, but only partially fills the gap space 49 to a first amount. See FIG. 5. When the CGM 10 in a second (or running) mode where the flywheel assembly 40 is rotating at least five thousand rpm, the liquid heat transfer medium 122 partially fills the reservoir portion 48b and fills the gap space 49 by a second amount, with the second amount being more than the first amount. See FIG. 6. The mass of the liquid heat transfer medium 122 present in the flywheel assembly 40 does not change between the first and second modes; no liquid heat transfer medium 122 is intentionally added or subtracted from the flywheel assembly 40 in the two modes, or when changing between the two mode modes, or during the bearing cooling process. Instead, the change in distribution of the liquid heat transfer medium 122 is due to different forces acting on the liquid heat transfer medium 122 and the configuration of the cavity 46. When the CGM 10 is in the first mode as shown in FIG. 5, the liquid heat transfer medium 122 is subject to gravity. In addition, in the first mode, the gap space 49 is underfilled by the liquid heat transfer medium 122, such that a gas pocket 124 is formed in the first portion 48a of the cavity 46 between the seal 125 and the liquid heat transfer medium 122. When the CGM 10 is in the second mode as shown in FIG. 6, the liquid heat transfer medium 122 is subject to both gravity and centrifugal forces. The addition of these centrifugal (outward) forces tends to make the liquid heat transfer medium 122 flow outward away from the flywheel rotational axis F. The centrifugal forces act on the liquid heat transfer medium 122 to urge it toward the first section 48a because the interior wall 12 in the first section 48a of cavity 46 is farther from the flywheel rotational axis F than the interior wall 12 in the second section 48b, with the amount of urging roughly proportional to the rotational speed of the flywheel assembly 40. Thus, under significant rotation, some portion of the liquid heat transfer medium 122 in the reservoir portion 48b moves into the gap space 49, which more fully fills the gap space 49. Note that the second amount of filing of the gap space 49 may result in the gap space 49 being fully occupied by the liquid heat transfer medium 122, or the amount of filling may be less, but more than in the first mode. As more of the liquid heat transfer medium 122 from the reservoir section 48b is displaced into the gap space 49, the gas pocket 124 is correspondingly displaced partially or advantageously fully into the reservoir portion 48b. Note also that the volume of the reservoir section 48b is optionally larger than the volume of the gas pocket 124 in the first mode, so that the entire gas pocket 124 can fit in the reservoir section 48b in the second mode. The gas in the gas pocket 124 may additionally undergo compression during or as a result of this displacement, if, for example, the volume of the liquid heat transfer medium 122 increases due to thermal expansion or other reasons. This means that the gas pocket 124 in the second mode may be smaller in volume than the gas pocket 124 in the first mode. Thus, the configuration of the interior wall 12 of the cavity 46 allows for the natural flow of the liquid heat transfer medium 122 due to centrifugal forces to aid in better filling of the gap space 49 with liquid heat transfer medium 122. Accordingly, the configuration of the interior wall 12 encourages there to be more liquid heat transfer medium 122 in the gap space 49 when the CGM 10 is in the second mode (rotating at five thousand rpm or more), when there is likely to be more heat to be removed from bearing 50, and thus more need for an efficient heat path from the bearing 50 to the heat transfer shaft assembly 130 through the liquid heat transfer medium 122. In addition, the presence of the reservoir portion 48b provides additional accommodation for changes in the volume of the liquid heat transfer medium 122 due to thermal expansion/contraction.

In some embodiments, the reservoir portion 48b has a floor forming a closed bottom, so that the cavity 46 is closed at the bottom by the reservoir floor, and sealed at the top by seal 125. However, in some embodiments, the flywheel shaft 44 optionally includes a longitudinal passage 45 that operatively interconnects the upper and lower cavities 46. Referring to FIGS. 3, 5-6, the flywheel shaft 44 has two ends 47, which may be referred to as the north end 47N, and the opposing south end 47S. The north end 47N includes the north cavity 46N, while the south end 47S includes the south cavity 46S. The ends 47N, 47S may be generically referred to as end 47, while the cavities 46N, 46S may be generically referred to as cavity 46. Longitudinal passage 45 connects the cavities 46N, 46S. Longitudinal passage 45 may be formed during forging of the flywheel shaft 44, by gun drilling the flywheel shaft 44, or by other means. The longitudinal passage 45 opens into each cavity 46, and allows for the liquid heat transfer medium 122 in the two cavities 46 to be in fluid communication. In addition, the longitudinal passage 45 allows for one cavity (e.g., 46S) to be inspected and/or filled from the opposing end (e.g., north end 47N) of the flywheel shaft 44. See PCT publication WO2022/072350. In addition, the presence of the longitudinal passage 45 allows fluid pressure of the liquid heat transfer medium 122 to be equalized between the north cavity 46N and the south cavity 46S, because the two cavities 46 are in fluid communication via the longitudinal passage 45, which may be beneficial for some situations. Note that the longitudinal passage 45 may, in some embodiments, be the only passage through the flywheel shaft 44 that connects the cavities 46. However, in some embodiments, there may be multiple longitudinal passages 45 that connect the cavities 46. If there are multiple passages 45, care should be taken in locating them so that the flywheel assembly 40 is properly balanced, such by locating the various passages symmetrically about the flywheel axis F. The longitudinal passage 45 is optionally smaller in cross-section (e.g., narrower) than the reservoir portion 48b of cavity, so that the first interior wall 12 in the reservoir portion 48b is positioned relative to the flywheel axis F such that the reservoir portion 48b is larger in cross-section than the longitudinal passage(s) 45.

In some embodiments, the cavity configuration with reservoir portion 48b is used in both the north and south cavities 46. However, in some embodiments, the cavity configuration with the reservoir portion 48b is used only in the north cavity 46N, and some other cavity configuration is used in the south cavity 46S. This may be advantageous in those embodiments that include the longitudinal passage 45 that links the cavities 46 because, in such situations, the gap space 49 of the lower cavity 46S should always be full of liquid heat transfer medium 122, regardless of whether the CMG 10 is in the first mode or the second mode, due to gravity and any gasses trapped in the flywheel assembly 40 being lighter than the liquid heat transfer medium 122. Thus, having a reservoir portion 48b in the south cavity 46S may have reduced utility.

The discussion above has generally been in the context of the heat transfer shaft assemblies 130 being separate from but affixed to the cover plates 36; however, it should be understood that in some embodiments the heat transfer shaft assemblies 130, and/or portions thereof such as the sleeves 136, are optionally integrally formed with the corresponding cover plate 36.

The seal(s) 125 may optionally be uneven seals that provide uneven amounts of sealing (resistance to fluid flow) in different directions. These uneven seals 125 may both be oriented with their weaker sealing directions both being oriented in an outside-to-in direction, or the uneven seals may be oriented in opposing directions, such as the upper seal 125 being oriented with its weaker sealing direction being oriented outward away from the corresponding cavity 46 and the lower seal 125 being oriented with its weaker sealing direction being oriented inward toward the corresponding cavity 46. See publication WO2022072433 (PCT/US2021/052561), the disclosure of which is incorporated herein by reference in its entirety.

As mentioned above, it should be understood that the roles and positions of the north and south cavities 46 (and north and south ends 47, and the orientations of the north and south seals 125) may be reversed, as is desired.

The present disclosure may, of course, be carried out in other ways than those specifically set forth herein without departing from essential characteristics of the disclosure. The present embodiments are to be considered as illustrative, and all changes coming within the meaning and equivalency range of the appended claims are intended to be embraced therein.

What is claimed is:

1. A gyroscopic roll stabilizer for a boat, the gyroscopic stabilizer comprising:
   an enclosure mounted to a gimbal for rotation about a gimbal axis and configured to maintain a below-ambient pressure;
   a flywheel assembly including a flywheel and flywheel shaft; the flywheel shaft having a first end and an opposite second end; wherein the flywheel assembly is rotatably mounted inside the enclosure for rotation about a flywheel axis; the flywheel shaft having a first open-ended cavity formed in the first end and facing away from the second end;
   a motor operative to rotate the flywheel assembly;
   a first heat transfer shaft assembly rotationally fixed relative to the flywheel axis and extending from the enclosure into the first cavity;
   a first seal mounted so as to contact both the first heat transfer shaft assembly and the flywheel shaft;
   wherein a first interior wall of the flywheel shaft outwardly bounds the first cavity and faces toward the flywheel axis, the first interior wall radially spaced from the first heat transfer shaft assembly by a first gap space;
   wherein the first cavity has a first portion disposed about the first heat transfer shaft assembly, and a second portion disposed farther from the first seal than a tip of the first heat transfer shaft assembly; the second portion forming a reservoir;
   wherein the first interior wall is spaced farther from the flywheel axis in the first portion than in the second portion;
   a liquid heat transfer medium disposed in the first cavity and trapped in the flywheel shaft by the first seal;
   wherein the gyroscopic roll stabilizer is configured such that:
      when the gyroscopic roll stabilizer is in a first mode where the flywheel assembly is not rotating, the liquid heat transfer medium fills the reservoir and partially fills the gap space of the first portion by first amount so that a gas pocket exists in the gap space between the first seal and the liquid heat transfer medium; and
      when the gyroscopic roll stabilizer is in a second mode where the flywheel assembly is rotating at least five thousand rpm, the liquid heat transfer medium partially fills the reservoir and at least partially fills the gap space of the first portion by second amount, the second amount more than the first amount, and the gas pocket is at least partly disposed in the second portion of the first cavity.

2. The gyroscopic roll stabilizer of claim 1:
   wherein the flywheel shaft further comprises a second open-ended cavity formed in the second end and facing away from the first end; and
   further comprising a second heat transfer shaft assembly rotationally fixed relative to the flywheel axis and extending from the enclosure into the second cavity;
   further comprising a second seal mounted so as to contact both the second heat transfer shaft assembly and the flywheel shaft.

3. The gyroscopic roll stabilizer of claim 2:
   wherein the flywheel shaft further comprises a longitudinal passage connecting the first cavity and the second cavity;
   wherein the gyroscopic roll stabilizer is configured such that the liquid heat transfer medium fills the second cavity in the first mode and the second mode.

4. The gyroscopic roll stabilizer of claim 2:
   wherein the flywheel shaft further comprises a longitudinal passage connecting the first cavity and the second cavity;
   wherein the first interior wall in the second portion of the cavity is positioned relative to the flywheel axis such that the second portion of the cavity is larger in cross-section than the longitudinal passage.

5. The gyroscopic roll stabilizer of claim 1, wherein the gyroscopic roll stabilizer is configured such that when the gyroscopic roll stabilizer is in the second mode the liquid heat transfer medium fills at least 85% of the gap space.

6. The gyroscopic roll stabilizer of claim 1, wherein the heat transfer medium comprises a hydrocarbon oil, a fluorocarbon oil, a silicone fluid, or combinations thereof.

7. The gyroscopic roll stabilizer of claim 1:
   wherein the gyroscopic roll stabilizer is configured such that in the second mode, the gas pocket is disposed fully in the second portion.

8. The gyroscopic roll stabilizer of claim 1:
   wherein the heat transfer shaft assembly includes a shaft extending into the first cavity; the shaft having an outer surface in contact with the heat transfer medium;
   wherein the first interior wall, in the second portion, is disposed farther from the flywheel axis than the outer surface of the heat transfer shaft.

9. The gyroscopic rolls stabilizer of claim 1, wherein a majority of the first interior wall, in the second portion of the cavity, is straight and parallel to the flywheel axis.

10. The gyroscopic roll stabilizer of claim 1, wherein the flywheel and the flywheel shaft are integrally formed with one another.

11. A method of operating a gyroscopic roll stabilizer for a boat; the method comprising:
    changing the gyroscopic roll stabilizer from a stopped mode to a running mode;
    wherein the gyroscopic roll stabilizer comprises:
       an enclosure mounted to a gimbal for rotation about a gimbal axis and configured to maintain a below-ambient pressure;
       a flywheel assembly including a flywheel and flywheel shaft; the flywheel shaft having a first end and an opposite second end; wherein the flywheel assembly is rotatably mounted inside the enclosure for rotation about a flywheel axis; the flywheel shaft having a first open-ended cavity formed in the first end and facing away from the second end;

a first heat transfer shaft assembly rotationally fixed relative to the flywheel axis and extending from the enclosure into the first cavity;

a first seal mounted so as to contact both the first heat transfer shaft assembly and the flywheel shaft;

wherein a first interior wall of the flywheel shaft outwardly bounds the first cavity and faces toward the flywheel axis, the first interior wall radially spaced from the first heat transfer shaft assembly by a first gap space;

wherein the first cavity has a first portion disposed about the first heat transfer shaft assembly, and a second portion disposed farther from the first seal than a tip of the first heat transfer shaft assembly; the second portion forming a reservoir; wherein the first interior wall is spaced farther from the flywheel axis in the first portion than in the second portion;

a liquid heat transfer medium disposed in the first cavity and trapped in the flywheel shaft by the first seal;

wherein, in the stopped mode, the flywheel assembly is not rotating, and the liquid heat transfer medium fills the reservoir and partially fills the gap space of the first portion by first amount so that a gas pocket exists in the gap space between the first seal and the liquid heat transfer medium;

wherein, in the running mode, the flywheel assembly is rotating at least five thousand rpm, and the liquid heat transfer medium partially fills the reservoir and at least partially fills the gap space of the first portion by second amount, the second amount more than the first amount, and the gas pocket is at least partly disposed in the second portion of the first cavity;

wherein the changing of modes comprises moving at least some liquid heat transfer medium from the second portion to the first portion of the first cavity without changing a mass of the liquid heat transfer medium in the flywheel shaft; and wherein no liquid heat transfer medium is added or subtracted from the flywheel shaft during the changing of modes.

12. The method of claim 11, wherein, in the running mode, the liquid heat transfer medium fills at least 85% of the gap space.

13. The method of claim 11:

wherein the flywheel shaft further comprises a second open-ended cavity formed in the second end and facing away from the first end; and wherein the gyroscopic roll stabilizer further comprises:
a second heat transfer shaft assembly rotationally fixed relative to the flywheel axis and extending from the enclosure into the second cavity;
a second seal mounted so as to contact both the second heat transfer shaft assembly and the flywheel shaft;
wherein the flywheel shaft further comprises a longitudinal passage connecting the first cavity and the second cavity;
wherein the liquid heat transfer medium fills the second cavity in the stopped mode and the running mode.

14. The method of claim 13, wherein the first interior wall in the second portion of the cavity is positioned relative to the flywheel axis such that the second portion of the cavity is larger in cross-section than the longitudinal passage.

15. The method of claim 11, wherein a majority of the first interior wall, in the second portion of the cavity, is straight and parallel to the flywheel axis.

16. The method of claim 11, wherein the heat transfer medium comprises a hydrocarbon oil, a fluorocarbon oil, a silicone fluid, or combinations thereof.

17. The method of claim 11, wherein the changing from the stopped mode to the running mode causes the gas pocket to be displaced fully into the second portion.

18. The method of claim 11:

wherein the heat transfer shaft assembly includes a shaft extending into the first cavity; the shaft having an outer surface in contact with the heat transfer medium;

wherein the first interior wall, in the second portion, is disposed farther from the flywheel axis than the outer surface of the heat transfer shaft.

19. The method of claim 11, further comprising thereafter changing from the running mode to the stopped mode, thereby causing the gas pocket to be displaced fully into the first portion of the first cavity, proximate the first seal.

20. The method of claim 11, wherein, in the running mode, the flywheel assembly is rotating at approximately nine thousand rpm or more.

\* \* \* \* \*